United States Patent [19]
Asado

[11] 3,839,913
[45] Oct. 8, 1974

[54] MAGNETIC FLOWMETER
[75] Inventor: Yasuo Asado, Chigasaki, Japan
[73] Assignee: Fischer & Porter Co., Warminster, Pa.
[22] Filed: June 6, 1973
[21] Appl. No.: 367,386

[30] Foreign Application Priority Data
July 31, 1972 Japan.............................. 47-76710

[52] U.S. Cl. .......................................... 73/194 EM
[51] Int. Cl. .............................................. G01f 1/00
[58] Field of Search ....... 73/194 EM; 335/213, 214, 335/299

[56] References Cited
UNITED STATES PATENTS
2,831,136  4/1958  Hanlet ............................ 335/299 X
3,743,983  7/1973  Holman .......................... 335/213 X
3,757,576  9/1973  Rolff et al...................... 73/194 EM Primary Examiner—Charles A. Ruehl

[57] ABSTRACT

A magnetic flowmeter including a conduit through which fluid to be metered is caused to flow, the conduit having a pair of electrodes disposed at diametrically opposed positions thereon. To establish a magnetic field at right angles both to the direction of flow and to the longitudinally extending plane which includes said electrodes, a pair of coils is wound about the conduit, one coil having a layer of convolutions inclined relative to the longitudinal plane, the other coil being wound about the first coil and having a layer of convolutions reversely inclined relative to this longitudinal plane.

3 Claims, 4 Drawing Figures

MAGNETIC FLOWMETER

BACKGROUND OF INVENTION

This invention relates generally to magnetic flowmeters and more particularly to an improved excitation coil for generating a magnetic field in a flowmeter.

In a conventional magnetic flowmeter, fluid to be metered is fed through a conduit formed of non-magnetic material and lined with an insulating sleeve. The fluid passing through the conduit makes contact with a pair of electrodes disposed at diametrically opposed positions in the conduit. Also provided is a pair of electromagnetic coils that function to generate a magnetic field which is perpendicular both to the direction of flow and to the longitudinal plane including the electrodes, whereby a voltage is induced in the electrodes as a function of flow rate.

In the usual magnetic flow meter arrangement, the coils are saddle-shaped. In the making of such coils the first step is to prepare a pair of flat-shaped coils which are wound in a circular or oval configuration. The number of coil turns depends on the required magnetic field strength. Second, each of these coils must be shaped to conform to the circumference of the flow conduit. The coils are then placed on the conduit to occupy opposing positions thereon.

The conventional saddle-shaped coil arrangement has several defects. One of the problems encountered is that the outside diameter of the meter cannot be reduced because of the space requirements of these coils. Another problem is the relatively high manufacturing cost.

In the conventional arrangement, the manufacturing procedures in forming and installing the saddle-shaped coils are complicated and add materially to production costs. Moreover, in constructing a saddle-shaped coil, the wires of the coil, on occasion, are short circuited when the flat-shaped coil which is first produced, is thereafter forced into a saddle-shaped formation about the circumference of the conduit.

SUMMARY OF INVENTION

In view of the foregoing, it is the main object of the invention to provide a low-cost magnetic flowmeter having an improved excitation coil arrangement.

Also an object of this invention is to provide a magnetic flowmeter whose outside diameter can be made smaller than that of a conventional meter.

Briefly stated, these objects are accomplished in a flowmeter in which the fluid to be metered is conducted through a conduit having a pair of electrodes at diametrically-opposed positions thereon. To establish a magnetic field at right angles both to the direction of flow and to the longitudinally extending plane which includes these electrodes, a pair of coils is provided, one coil having a layer of convolutions inclined relative to said longitudinal plane, the other coil being wound about the first coil and having a layer of convolutions reversely inclined relative to said longitudinal plane.

OUTLINES OF THE DRAWINGS

For a better understanding of the invention as well as other objects and further features thereof, reference is made to the following detailed description to be read in conjunction with the accompanying drawings, wherein.

DESCRIPTION OF THE INVENTION

Figure 1A:
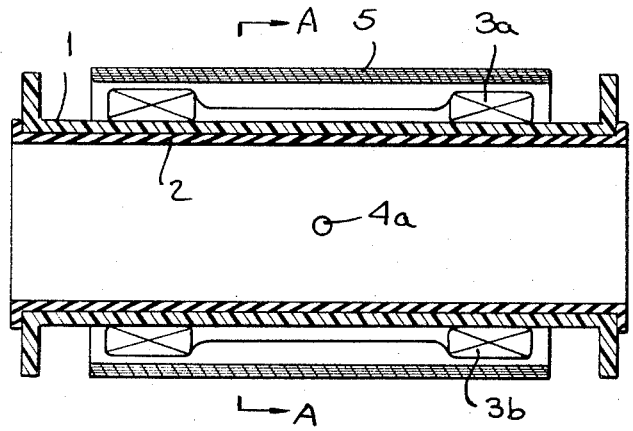
FIG. 1(a) is a longitudinal section of a conventional magnetic flowmeter.
Figure 1B:
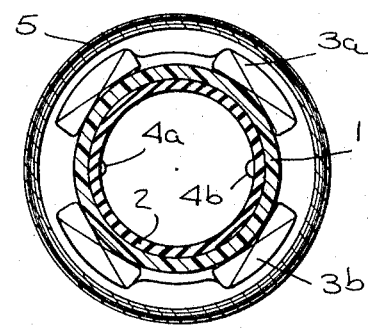
FIG. 1(b) is a transverse section taken in the plane indicated by line A—A in FIG. 1(a)

Referring now to FIGS. 1(a) and (b) there is shown a conventional magnetic flowmeter which includes a conduit 1, formed of non-magnetic material. The interior of the conduit is lined with an insulating sleeve 2. Mounted on conduit 1 on opposite sides thereof is a pair of saddle-shaped coils 3a and 3b for generating a magnetic field perpendicular to the direction of flow in the conduit and to the longitudinal plane which includes a pair of electrodes 4a and 4b. These electrodes, which are disposed at diametrically opposed positions located at the central portion of the conduit, make contact with the fluid passing therethrough.

A cylindrically-shaped laminated core 5, formed of magnetic material surrounds the excitation coils 3a and 3b, so that the return path of the magnetic flux generated thereby passes through the coil.

As pointed out previously, these saddle-shaped coils are difficult and costly to manufacture and install, and they also preclude a reduction in the overall diameter of the meter.

Figure 2A:
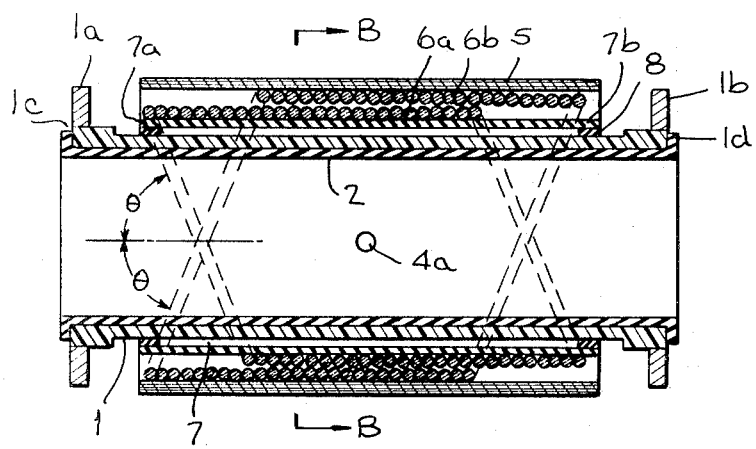
FIG. 2(a) is a longitudinal section of a preferred embodiment of a magnetic flowmeter in accordance with the invention.

In the arrangement according to the invention shown in FIGS. 2(a) and (b), the magnetic flowmeter has the same components as those disclosed in FIGS. 1(a) and (b) and are identified by like reference numerals, save for the excitation coils. In this arrangement, flanges 1(a) and 1(b) are screwed to the opposite ends 1(c) and 1(d) of the conduit 1. Wound on a cylindrical bobbin 7 are a pair of excitation coils 6(a) and 6(b). Coil 6(a) is cylindrical, the convolutions thereof being inclined at an angle $\theta$ relative to the longitudinal plane which includes electrodes 4(a) and 4(b). Coil 6(b) which is wound about coil 6(a) is also cylindrical, the convolutions thereof being reversely inclined with respect to those of coil 6(a) at an angle $\theta$ relative to said longitudinal plane, whereby the convolutions of coil 6(a) intersect those of coil 6(b). The bobbin 7 is maintained in coaxial relationship to conduit 1 by means of annular spacers 8 disposed adjacent the opposing ends of the bobbin.

Figure 2B:
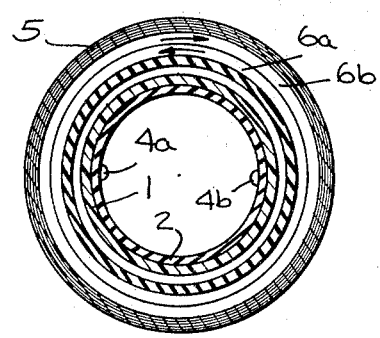
FIG. 2(b) is a transverse section taken in the plane indicated by line B—B in FIG. 2(a).

Thus when reversely directed excitation currents are supplied to excitation coils 6(a) and 6(b), as indicated by the arrows in FIG. 2(b), the uniform magnetic field generated by these coils is perpendicular to the longitudinal plane including electrodes 4(a) and (b) and the flow axis of conduit 1.

In the embodiment illustrated, excitation coil 6(a) is of the single layer type and is wound continuously along the circumference of bobbin 7, and excitation coil 6(b) wound about coil 6(a) is also a single layer coil. But in practice, these coils may be of the multi-layer type, the layers of coils 6(a) and 6(b) being alternately wound to obtain the required magnetic field strength.

The manner in which coils 6(a) and 6(b) are constructed will now be explained in greater detail. For this purpose use may be made of a standard coil winding machine adapted to produce slanted turns. First, the end of the coil wire is secured to an end portion 7(a) of the bobbin 7. Then the first layer of coil 6(a) is wound and fixed in place with a suitable bonding agent. Upon completion of the first layer, the end of another coil wire is secured to the opposite end portion 7(b) of the bobbin and the second layer which constitutes coil 6(b) is wound over the first layer. Thus the excitation coils are alternately wound in successive layers until an appropriate number of layers are formed on bobbin 7. By unfastening flanges 1(a) and 1(b) from the ends of conduit 1, bobbin 7 about which coils 6(a) and 6(b) are wound may then be fitted over conduit 1.

Thus, in accordance with this invention, the magnetic flowmeter may be economically constructed without difficulty, and the outside diameter of the meter may be made smaller than that of a conventional meter because of the cylindrical excitation coils which take the place of the conventional saddle-shaped coil. Moreover, with the present invention, one does not experience accidental short-circuits between the coil wires or damage to the insulation, for there is no need to forcibly shape the coils into a saddle-like formation along the circumference of the conduit.

Though the excitation coils 6(a) and 6(b) have been described as wound on bobbin 7, it is also possible to wind these coils directly on conduit 1. Also the same coil arrangement may be used to form the deflection yoke of a cathode ray tube.

While there have been shown and described preferred embodiments of a magnetic flowmeter, it will be appreciated that many changes and modifications may be made therein without, however, departing from the essential spirit thereof.

What is claimed is:

1. A magnetic flowmeter comprising:
   A. a conduit through which flows the fluid to be metered;
   B. a pair of diametrically opposed electrodes mounted on said conduit, the flow axis of said conduit lying in a longitudinal plane which passes through said electrodes; and
   C. a pair of coils wound about said conduit over a substantial portion of the length thereof, one of said coils having a layer of convolutions inclined relative to said longitudinal plane that includes said electrodes, the other of said coils having a layer of convolutions reversely inclined relative to said longitudinal plane, said coils, when energized, producing within said conduit a substantially uniform magnetic field at right angles to said longitudinal plane whereby a voltage is induced in said electrodes as a function of flow rate.

2. A flowmeter as set forth in claim 1, wherein said coils are wound on a cylindrical bobbin coaxially disposed about said conduit.

3. A flowmeter as set forth in claim 1 further including a cylindrical magnetic core surrounding said coils.

* * * * *